United States Patent
Astarabadi et al.

(10) Patent No.: US 6,701,357 B1
(45) Date of Patent: Mar. 2, 2004

(54) SERVER APPLIANCE

(75) Inventors: Shaun Astarabadi, Laguna Niguel, CA (US); Glenn Swonk, Laguna Niguel, CA (US); Andrew McCloskey, Yorba Linda, CA (US)

(73) Assignee: Toshiba America Information Systems, Inc., Irvine, CA (US)

( * ) Notice: Subject to any disclaimer, the term of this patent is extended or adjusted under 35 U.S.C. 154(b) by 0 days.

(21) Appl. No.: 09/553,430

(22) Filed: Apr. 19, 2000

(51) Int. Cl.[7] .................. G06F 15/177; G06F 13/10; G06F 9/44
(52) U.S. Cl. .................. 709/220; 709/321; 717/170; 713/1
(58) Field of Search .................. 709/220, 229, 709/321, 327, 328; 713/2; 717/168, 170

(56) References Cited

U.S. PATENT DOCUMENTS

| | | | |
|---|---|---|---|
| 5,657,448 A | * | 8/1997 | Wadsworth et al. ........ 709/220 |
| 6,289,396 B1 | * | 9/2001 | Keller et al. ................. 709/323 |
| 6,301,612 B1 | * | 10/2001 | Selitrennikoff et al. ..... 709/220 |
| 6,393,495 B1 | * | 5/2002 | Flory et al. .................. 709/327 |
| 6,487,601 B1 | * | 11/2002 | Hubacher et al. ........... 709/229 |
| 6,493,798 B2 | * | 12/2002 | Klein .......................... 709/330 |
| 6,539,473 B1 | * | 3/2003 | Hubacher et al. .............. 713/2 |

* cited by examiner

Primary Examiner—David Wiley
Assistant Examiner—Michael Delgado
(74) Attorney, Agent, or Firm—Pillsbury Winthrop LLP

(57) ABSTRACT

A server appliance for use in a network of client users is disclosed. The server appliance includes a hub for coupling to one or more client computer workstations. Each client computer workstation is configured to communicate with the server appliance based upon the operating system hosted on the server appliance. The server appliance includes a control panel with a display which enables a system operator to retrieve forgotten password information and initiate an automated procedure for backing up data stored on a non-volatile memory at the appliance server. Additionally, the server appliance includes a parallel port for coupling to a shared parallel port printer which receives print jobs originating at the client computer workstations.

10 Claims, 6 Drawing Sheets

SERVER APPLIANCE

BACKGROUND

1. Field of the Invention

Embodiments described herein relate to computer networks. In particular, embodiments herein relate to computer networks serving one or more client users.

2. Related Art

Local area networks (LANs) and wide area networks (WANs) have provided enterprises with a system allowing computer workstations to communicate with one another through routers and servers. Such LANs and WANs typically include gateways to a public data communication network such as the Internet. Establishing communication between computer workstations in the network with a network server typically requires specialized and cost by expertise to ensure that network software on the computer workstations is configured properly to communicate with the server. There is, therefore, a need for a more simplified system and method of configuring client computer workstations to communicate with the server.

Enterprise networks typically include a printer server or spooler for transmitting print jobs to a network printer. This typically requires implementing complicated print driver software in the printer server to format print jobs for a particular network printer coupled to the network through an Ethernet port. There is a need for more simplified system of sharing printer resources among users in an enterprise network.

Enterprise networks typically provide shared memory resources allocated to users on the network. The files stored on these shared memory devices is typically backed-up on a periodically basis to a separate backup memory such as a tape drive. This process typically requires operator involvement to load the tape to the tape drive and input of commands to the network server to copy the files to the backup memory. There is a need for a simpler, more convenient system and method of creating backup images for shared memory resources in an enterprise network.

SUMMARY

Embodiments of the present invention are directed to a server appliance for communication with one or more client computer workstations in a data communication network. In one embodiment, a procedure initiates communication between a client computer workstation and the server appliance based upon a version of an operating system executing on the client computer workstation. In another embodiment, a control panel allows a system operator or administrator to display system information from the server appliance by making input selections at the control panel. In another embodiment, the server appliance acts as a printer server for a shared parallel port printer. In another embodiment, administrative privileges may be delegated to an administrator at a remote server in a public data communication network. These and other embodiments are described in the following description and Figures.

DETAILED DESCRIPTION

Figure 1:
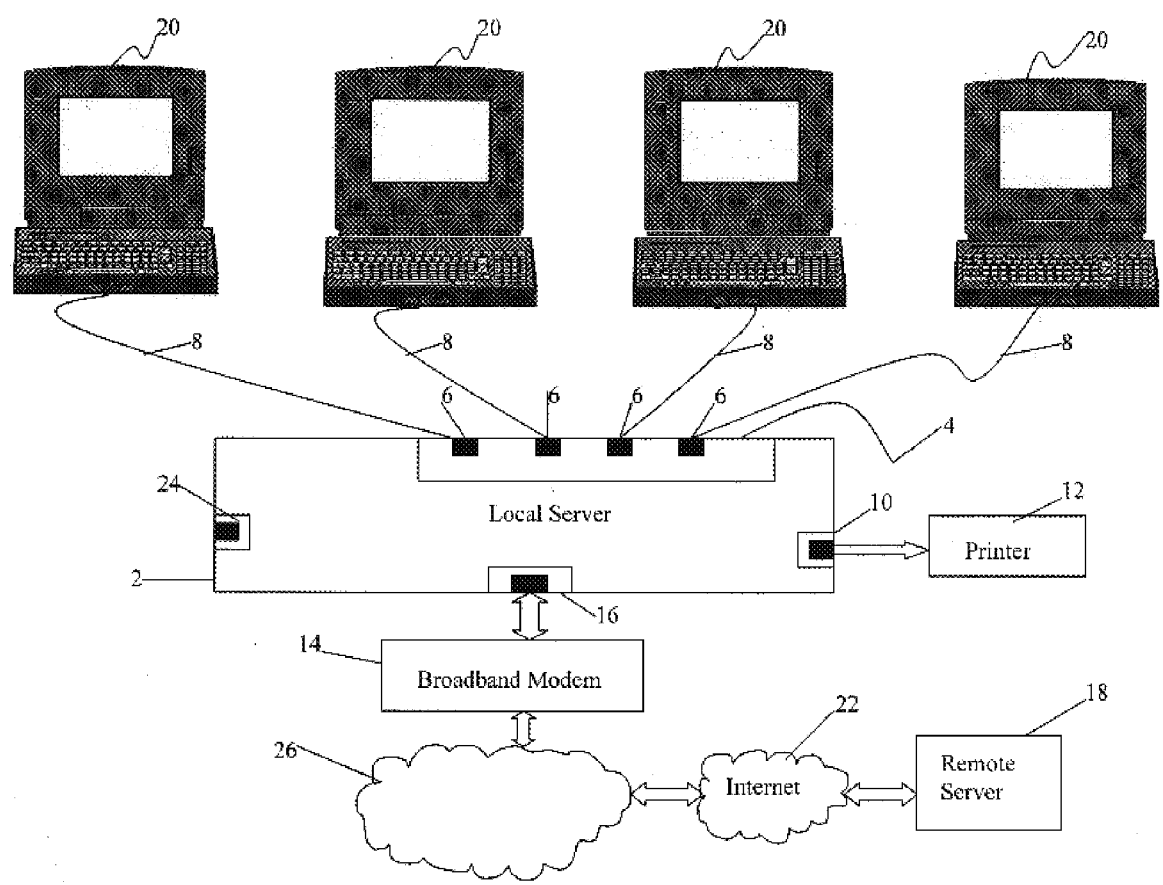
FIG. 1 shows a network topology including a local server according to an embodiment.

Embodiments of the present invention are directed to aspects of a server in a data communications network providing services to one or more client computer workstations. FIG. 1 shows a network topology including a local server 2 coupled to client computer workstations 20 through links 8 and an integrated hub 4. In the illustrated embodiment, the integrated hub provides a plurality of Ethernet connections 6, each Ethernet connection 6 being adapted to be coupled to a distinct computer workstation 20 through a corresponding data link 8. The local server 2 also includes a parallel port 10 coupled to a parallel port printer 12 and an Ethernet port 16. The Ethernet port 16 may be coupled to a broadband data source 26 such as a cable service or digital subscriber line (DSL) service through a compatible broadband modem 14. Alternatively, the port 16 may be coupled to other broadband data sources such as broadband satellite or terrestrial wireless communication services. In yet another embodiment, the port 16 is coupled to a local area network (LAN) or wide area network (WAN) as part of a larger private network.

The local server 2 may implement a firewall for monitoring data traffic between the data source 26 and the client complete workstations 20. In the embodiment in which the local server 2 is part of a larger private network such as a LAN or WAN, such a firewall may be provided at a gateway which transports data between a public data communication network and the private network.

In the illustrated embodiment, a remote server 18 may communicate with the local server 2 through a public data communication network such as the Internet 22. Also, the local server 2 includes a dial-up modem 24 to enable point to point communication with a remote mobile client user.

Each of the client computer workstations 20 may have a keyboard, display, and pointer device such as a mouse or track ball. The client computer workstation may also host an operating system which supports a graphical user interface (GUI) such as Windows 98, Windows 2000 or Windows NT 4.0 sold by Microsoft. Accordingly, the client computer workstations 20 include sufficient CPU and random access memory (RAM) resources to support the hosted operating system. Additionally, the computer workstations 20 may include a network card and corresponding Ethernet port for communicating with the local server 2 through the links 8. The client computer workstations 20 may also include a memory drive for receiving a removable memory medium such as a CD ROM drive or floppy disk drive in addition to a hard drive with a fixed memory. The communication link 8 coupling the client computer workstations 20 to the hub 4 may be an Ethernet cable or a wireless link coupling the Ethernet port of the client computer workstation 20 to a corresponding Ethernet port 6 on the hub 4. Such a wireless link may be compliant with the Bluetooth protocol or other known wireless communications format suitable for supporting bi-directional communication in a local environment.

Figure 2:
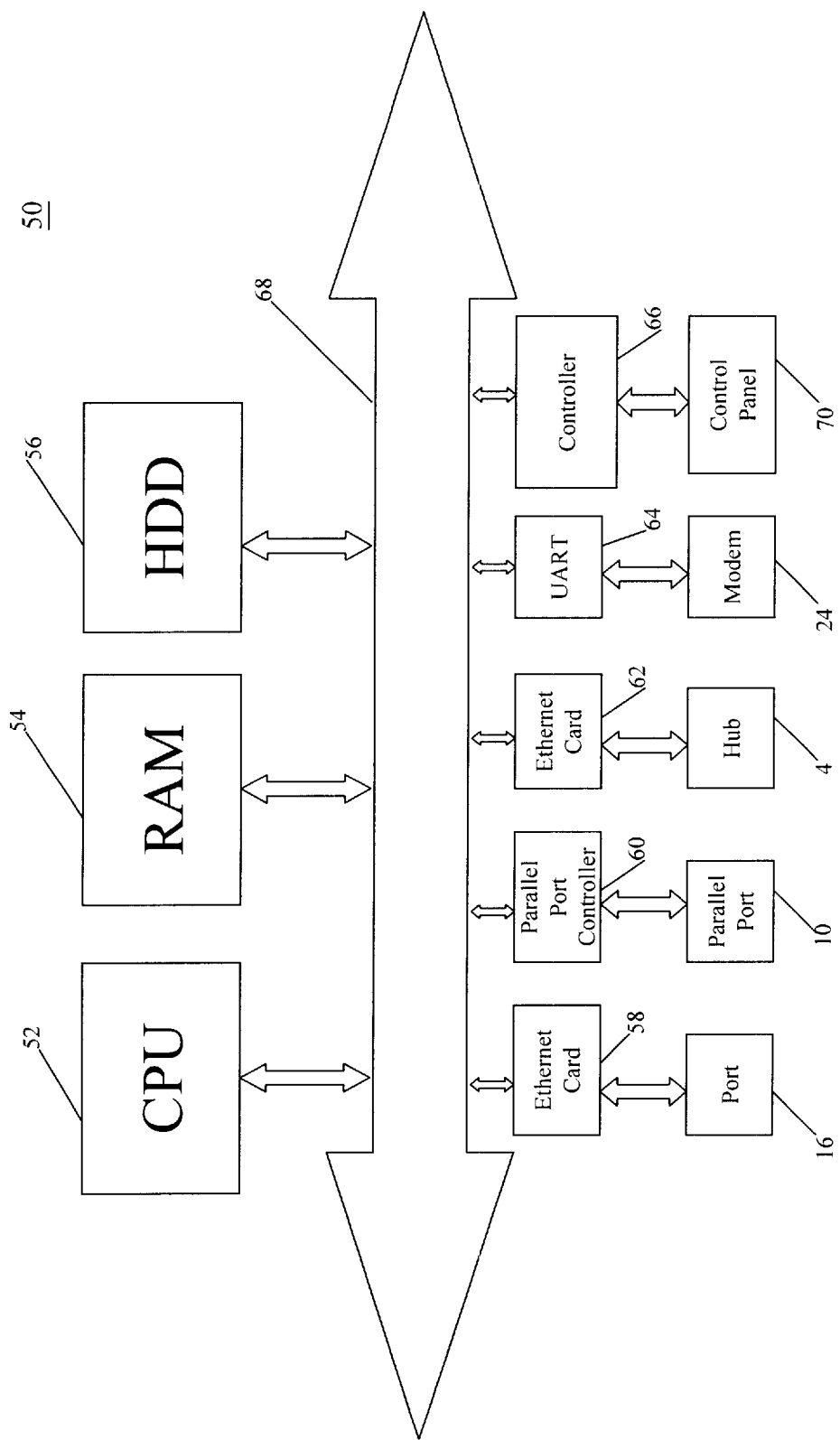
FIG. 2 shows a schematic diagram illustrating the hardware architecture of the local server of FIG. 1 according to an embodiment.

FIG. 2 shows a schematic diagram illustrating the architecture of 50 of the local server 2 according to an embodiment. A central bus 68 is coupled to a CPU 52, RAM 54, and hard disk drive (HDD) 56. The CPU 52 may be a 200 megahertz Celeron processor sold by Intel or other compatible microprocessors sold by other manufacturers such as Advanced Micro Devices (AMD). The architecture 50 may host a version of the Linux operating system or other suitable operating system which supports a communication protocol between the local server 2 and the client computer workstations 20, and between the local server 2 and the data source 16 (FIG. 1). Such communication protocols may include, for example, TCP/IP and the hypertext transfer protocol (HTTP). The architecture 50 also includes several communication devices coupled to the bus 68 including an Ethernet card 58 (for enabling communication with the Ethernet port 16), a parallel port controller 60 (for enabling communication with the printer 12 through the parallel port 10), an Ethernet card 62 (for communication between the hub 4 and the client computer workstations 20), a universal asynchronous receiver/transmitter,(UART) 64 (enabling point to point communication through the modem 24). The architecture 50 may be provided in a chassis within a single form factor enclosure as shown in the local server 2 of FIG. 1. The hub 4 may allocate network addresses to the client computer workstations 20 according to a dynamic host control protocol (DHCP) or may allocate such network addresses statically. The Ethernet port 16 may be assigned a network address from the data source 16 either statically or according to the DHCP.

The architecture 50 may include a control panel 70 which is external to the chassis enclosure of the local server 2 to be accessible by an operator or system administrator. The control panel 70 may include, among other things, an LCD display and selection buttons (not shown) which enable the operating system administrator to request specific status information be displayed on the LCD display. A controller 66 enables communication from the selection buttons to the processing hardware and from the processing hardware to the LCD display for showing the requested status information.

Figure 3A:
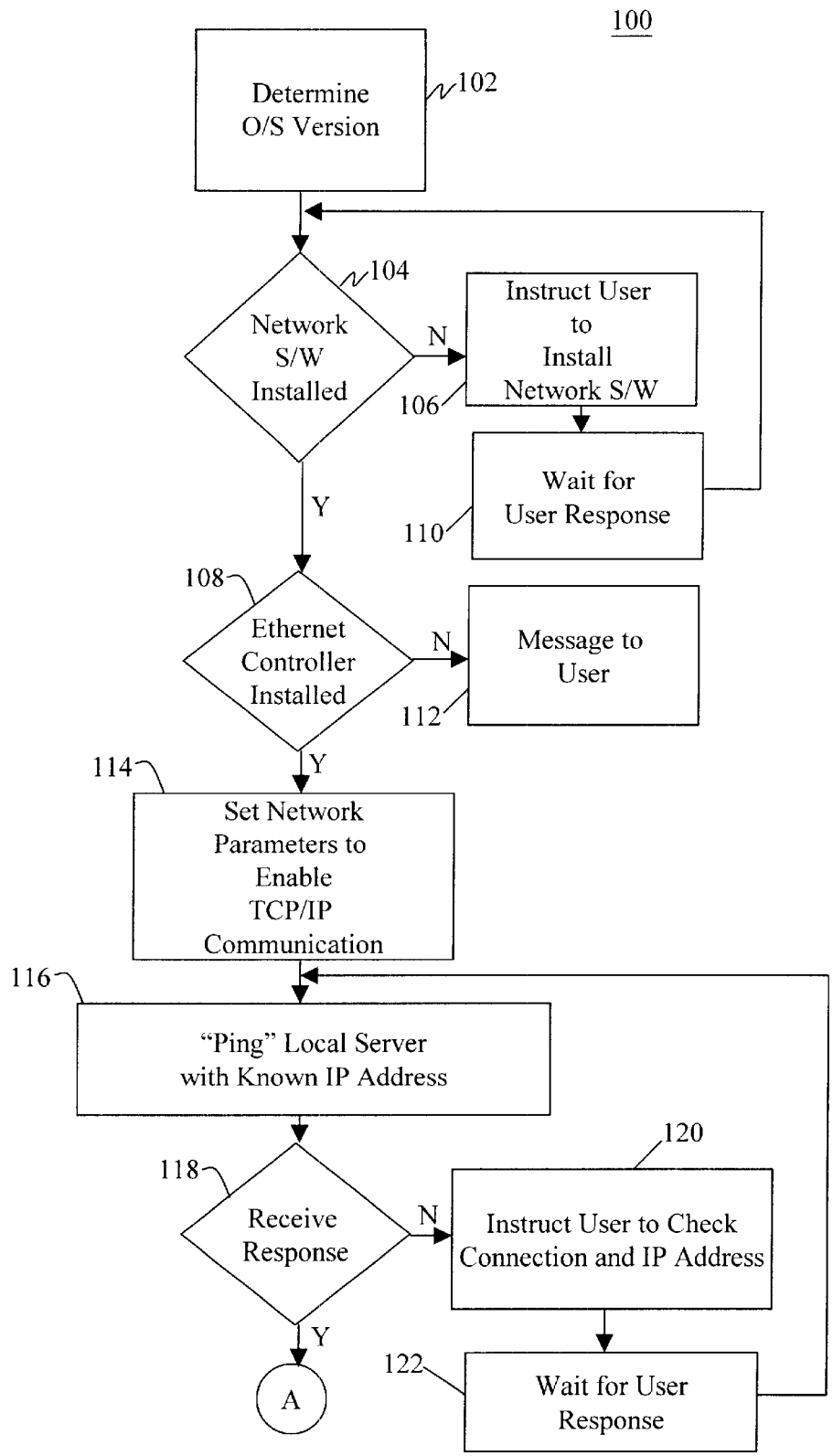
FIGS. 3A, 3B and 3C show a functional flow diagram of a process for establishing a communication protocol between the local server of FIG. 1 and one or more client computer workstations in a private network according to an embodiment.
Figure 3B:
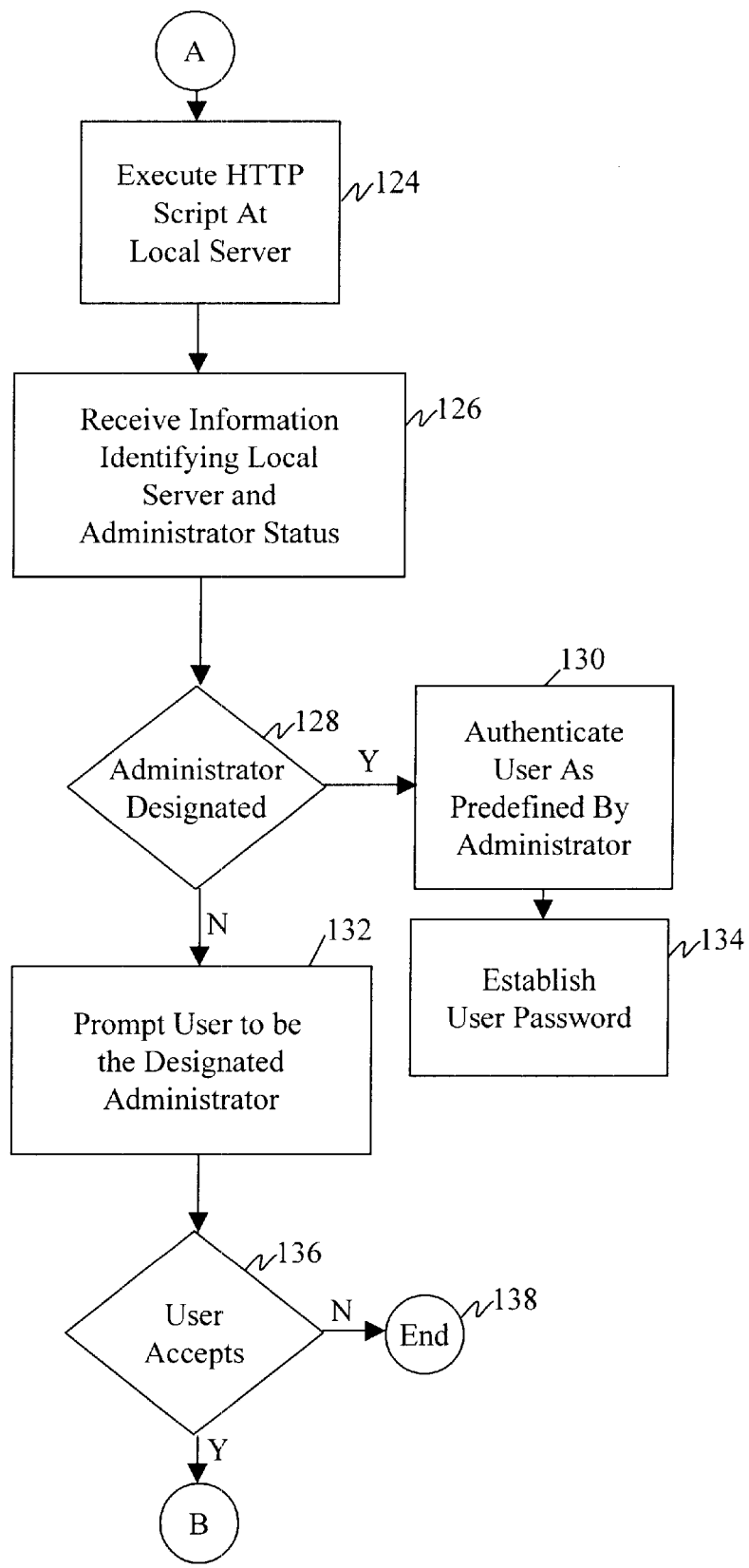
Figure 3C:
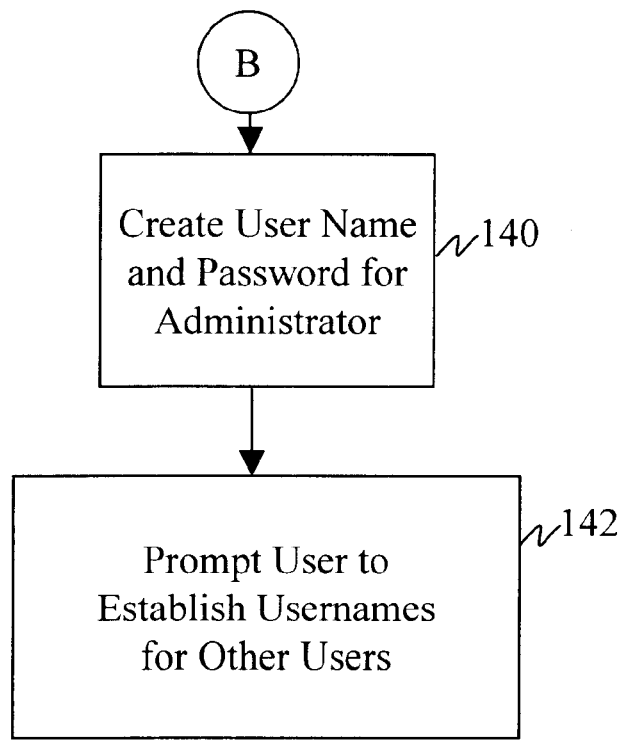

According to an embodiment of the present invention, a removable computer readable medium such as a CD ROM or floppy disk is inserted into a removable medium drive of the client computer workstations 20 to establish a communication protocol between the client computer workstation 20 and the local server 2. FIGS. 3A through 3C illustrate a process of executing a procedure stored on the computer readable medium to establish communication between a client computer workstation 20 and the server 2 according to an embodiment. Step 102 determines a particular operating system residing on the client computer workstation 20. For example, the operating system may be any one of several versions of Microsoft windows such as Windows 98, Windows 2000 and Windows NT 4.0. The operating system may be a version of any one of several other operating systems which support a GUI on the client computer workstations such as versions of the Macintosh operating system sold by Apple Computer or OS2 sold by IBM. Also, the operating system may also be versions of Linux or DOS.

Based upon knowledge of the particular operating system version, step 104 can determine whether network communication enabling software, such as software drivers for an Ethernet card, have been installed on the hard drive of the client computer workstation 20. If the network software is not installed, step 106 provides a message to the user instructing installation of the network software by, for example, instructing the user to install the network software from the operating system CD provided by the operating system manufacturer. Step 110 waits for a response from the user indicating that such network software has been installed, and step 104 is repeated to determine whether the network software has been installed.

Following the determination that the network software has been installed, step 108 determines whether an Ethernet controller card has been installed. This is accomplished by, for example, polling the software drivers for the Ethernet controller. If no Ethernet controller is detected, step 112 provides a message to the user that no Ethernet controller has been installed. If an Ethernet controller is installed, step 114 sets network parameters in the network software driver stack to enable TCP/IP communications through the Ethernet port. Step 116 then "pings" the hub 4 at the local server 2 with a known IP address. In the illustrated embodiment, the local server 2 is assigned a known IP address such as "192.168.1.1" which is indicated in the program for configuring the client computer workstation 20 for communication with the local server 2 on the removable medium. If the client computer workstation 20 does not receive a response from the local server 2 at step 118, step 120 displays a message to the user to check the physical connection between the Ethernet port of the client computer workstation 20 and the hub 4, and check the IP address of the local server 2. In the illustrated embodiment, the address of the local server 2 may be changed by a remote administrator via an agent as discussed below, or by physical tampering with the local server 2. The control panel 70 (FIG. 2) may receive input selections from a user having physical access to the local server 2 for requesting display of the assigned network address of the local server 2 on the LCD display of the control panel 70. This may be accomplished by, for example, associating a particular interrupt routine responding to signals from the controller 66 to retrieve the network address of the local server 2 from memory and display on the LCD display. Accordingly, the user may compare the network address provided on the LCD display with the network address displayed at the client computer workstation 20 and input the correct network address of the local server 2 if there is no match. Step 122 waits for a user to respond to the message at step 120 to attempt to ping the server again at step 116.

Upon receipt of a response to the ping from a local server 2, step 124 executes a script at the local server 2 to establish communication at the HTTP layer. Execution of the script results in transmission of information identifying the local server and administrative status which is received by the client computer workstation 20 at step 126. This information may include, among other things, the manufacturer of the local server 2, model number, version number, and version of the operating system at the local server 2. This information received at step 126 may also include administrator status information indicating whether a client user has been designated as the network administrator, and any pre-authorized client users.

If step 128 determines that an administrator has been designated, step 130 initiates an authentication process for the user by displaying a query at the client computer workstation 20 for a user name. If the user inputs a user name included in a list of pre-allocated user names received at step 126, step 134 initializes a process to establish a user's password by, for example, asking the user to select a password of appropriate character length.

If step 128 determines that a network administrator has not been designated, step 132 displays a prompt to the user asking the user if the user would like to be the designated administrator. If the user does not accept, the process terminates at step 138. Alternatively, if the user accepts, step 140 prompts the user to create a user name and password for the administrator and step 142 prompts the user to establish user names for other users for future use (e.g., at steps 130 and 134 for authenticating non-administrative users and their passwords).

In the illustrated embodiment, the designated administrator has certain privileges to the exclusion of other client users of the local server 2. For example, the designated administrator may have privileges to add or delete user accounts, retrieve password information for other client users and allocate memory resources on the HDD 56 (FIG. 2). The manufacturer of the local server 2 may maintain a remote server 18 shown in FIG. 1, which may communicate with the local server 2 through the Internet 22. Data source 26 may allocate a worldwide web address to the Ethernet port 16. According to an embodiment, the designated administrator has the ability to delegate or handoff administrative privileges to a remote server 18 through the Internet. This may be implemented in the form of an agent process residing at the local server 2 which is controlled by the administrator at the remote server 18 upon assuming administrative privileges. The handoff of administrative privileges may be invoked by a message received from the local administrator through the public data communications network or by a telephone call. The administrator at the remote server 18 may have additional privileges for access to operating system or system configuration files to diagnosis malfunction and take appropriate corrective action.

The HDD 56 may be used to store centralized files for a small business or enterprise which is essential to the functioning of the small business or enterprise. It, therefore, may be desirable to periodically backup the files of the HDD 56 to another memory device such as a backup tape drive or CD ROM press (not shown) coupled to the local server 2. In an alternative embodiment, the backup device may be attached to one of the client computer workstations 20 or at a remote location. An embodiment of the present invention is directed to receiving an input at the control panel 70 (e.g., a predetermined or menu driven selection of buttons or keystrokes) to initiate a backup of the entire image, or portions thereof, stored on the HDD 56. For example, input interpreted at the controller 66 may initiate or interrupt to execute a routine at CPU 52 to copy files from HDD 56 to the aforementioned backup memory device coupled to the local server 2. In an alternative embodiment, the backup routine may include transmitting the files to be backed up from the HDD 56 to the remote server 18 via the Internet 22. The remote server 18 may provide such a service to the operator or local server 2 on a subscription basis. The remote server 18 may then maintain backup files for the operator or local server 2 which are available upon request.

Figure 4:
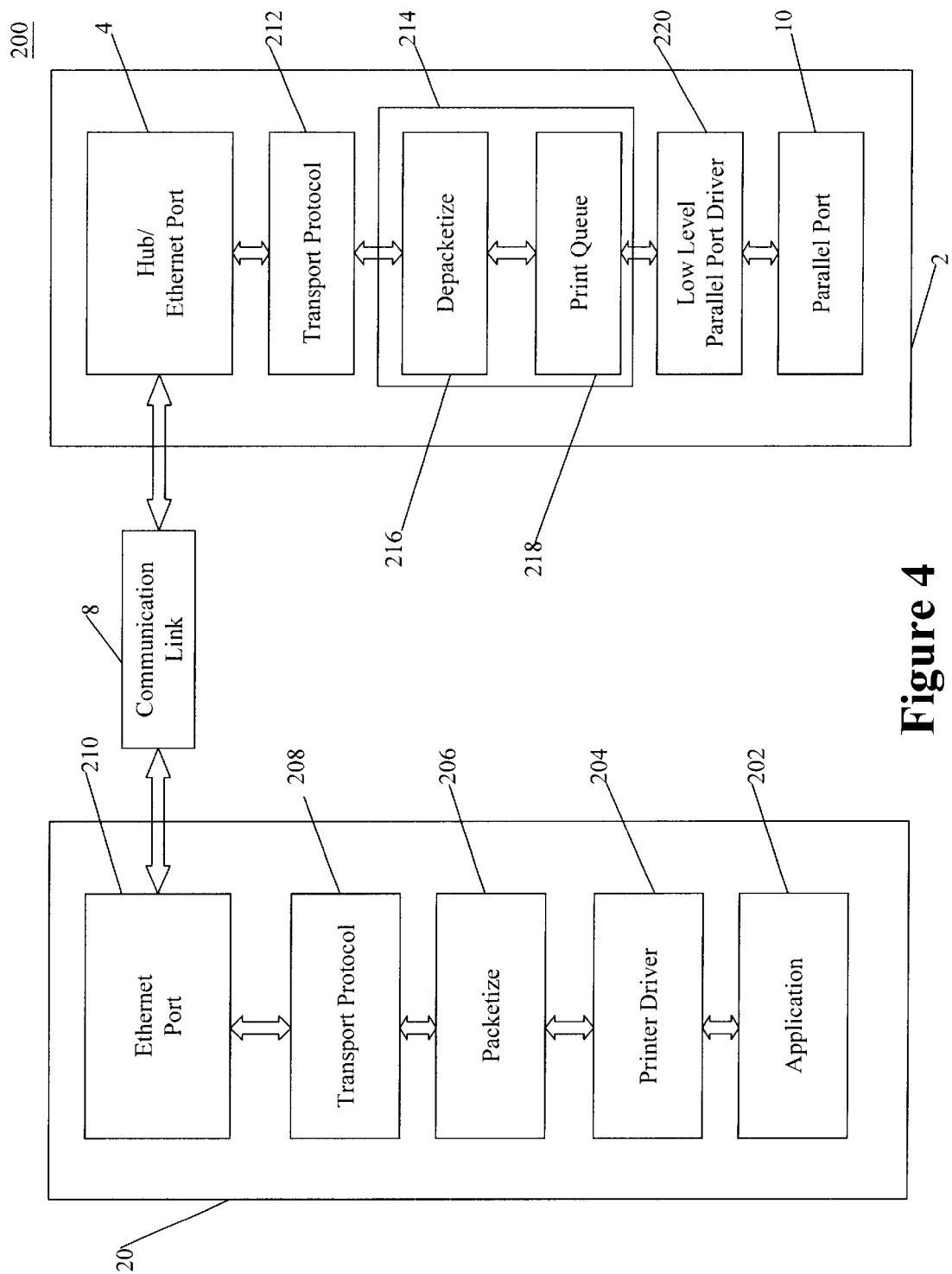
FIG. 4 shows a diagram illustrating a process of transmitting print jobs from a client computer workstation to a parallel port printer through a print queue at an embodiment of the local server shown in FIG. 2.

Another embodiment of the present invention is directed to implementing a print server for the printer 12 at the local server 2 which enables the client computer workstations 20 to share the printer 12 (FIG. 1). FIG. 4 illustrates an implementation of such a system which enables sharing of the printer 12. Here, the user creates a document for printing at an application 202 and request that the document be printed. A printer driver 204 creates a print job from the document received from the application 202. The print job created at the printer driver provides printer commands and image data in a suitable form to be received at the printer 12. For example, the created print job may include image data and printer commands interpretable by the printer 12 to accurately reproduce the document created at the application 202. The print job may be a form suitable for transmitting to a low level parallel port driver associated with a port coupled to a parallel port printer. In the illustrated embodiment, the print job is packetized and provided to a transport protocol driver 208 to be transmitted to the local server 2 through an Ethernet port 210 and communication link 8.

The packetized print job is received at the hub/Ethernet port 4 and provided to a print server 214 via an IP server 212. Print jobs received from the IP server 212 are depacketized and reassembled at a depacketize routine 216. The reassembled print jobs are suitable for transmitting to the printer 12 through a low-level parallel port driver. A print queue 218 stores and sequentially releases print jobs to the parallel port printer 12 through the low level parallel port driver 220 and parallel port 10. In an alternative embodiment, the print jobs may be depacketized as they are released from the print queue 218.

The print server 214 at the local server 2 enables the local server 2 to be used with any parallel port printer without having the software driver of the parallel port printer. Accordingly, no modifications are required to the local server 2 when a new parallel port printer (i.e., having a different print job format) is used. The client computer workstations 20 include the printer driver 204 which is compatible with the particular parallel port printer 12 coupled to the parallel port 10. Therefore, when a different parallel port printer 12 is coupled to the parallel port 10, a printer driver 204 which is compatible with the new printer may be enabled or installed at the client computer workstations 20.

Another embodiment of the present invention is directed to displaying information regarding the status of the local server 2 on the display portion of the client computer workstation 20. The operating system on a client computer workstation 20 may have logic for generating a particular image in the display in response to an absence of processing activity at the CPU of the client computer workstation 20. For example, versions of the Windows Operating System include logic for a "screen saver" which generates an image to be displayed after a prolonged period of an idle state at the CPU. In the illustrated embodiment, such screen saver logic may include a routine for transmitting a polling signal to the local server 2 for status information including, for example, the number of users currently actively logged into the system, available memory on the HDD 56, date of the last system backup, CPU utilization, and other such status information. Thus, the screen saver routine periodically transmits a polling signal down the network stack to be transmitted through the communication link 8 and received at the IP server of the local server 2. A status routine at the local server 2 responds to the polling signal by retrieving the status information from designated memory locations in the RAM 54 and transmitting information which is representative of the retrieved status information back to the requesting client computer workstation 20. The screen saver routine at the client computer workstation 20 interprets the received information and generates an alphanumeric display on the display screen to show the status information to the user.

According to an embodiment, the controller 66 associated with the control panel 70 may include logic for performing power up and power down procedures for the local server 2 according to a pre-specified schedule (FIG. 2). According to an embodiment, the CPU 52 resides on a motherboard. Here, the controller 66 maintains an internal clock and receives power from a power supply (not shown) in the local server 2 independently of the power source to the motherboard, RAM 54 and HDD 56. Logic in the controller 66 allows a system operator to specify a schedule for powering up and powering down the local server 2 (e.g., by specifying a time and date when the local server 2 is to be powered down and a time and date when the local server 2 is to be powered up).

To initiate a procedure to power down the local server 2, the controller 66 may transmit an interrupt signal to initiate the execution of a driver for shutting down the operating system. The controller 66 may then monitor the progress of the shut down procedure to detect completion by, for example, detecting a signal from the driver indicating completion of the shut down procedure or detecting an absence of a signal from the driver indicating that the shut down procedure is still in progress.

Upon determining that the shut down procedure has completed, the controller 66 may transmit a signal to the power supply to remove power from other select devices of the local server 2 such as the motherboard, the RAM 54 and the HDD 56. In an embodiment in which the power supply is digitally controlled, the controller 66 may transmit a power down signal to the power supply on a bus (not shown) to remove power from the select devices. Alternatively, the controller 66 may transmit a signal to a relay switch which causes the removal of power to the select devices. To restore power to the select devices of the local server 2, the controller 66 transmits a signal to the power supply to restore power to the select devices. Upon receipt of power at the motherboard, the local server 2 may re-boot or return to a state at which the local server 2 was previously shut down.

While there has been illustrated and described what are presently considered to be the preferred embodiments of the present invention, it will be understood by those skilled in the art that various other modifications may be made, and equivalents may be substituted, without departing from the true scope of the invention. Additionally, many modifications may be made to adapt a particular situation to the teachings of the present invention without departing from the central inventive concept described herein. Therefore, it is intended that the present invention not be limited to the particular embodiments disclosed, but that the invention include all embodiments falling within the scope of the appended claims.

What is claimed is:

1. In a computer network including a processor and a computer workstation, the processor having a first communication port and a configuration for communication through the first communication port according to a network protocol, the computer workstation hosting an operating system and having a second communication port and a memory drive for receiving a removable memory medium, the computer network further including a digital communication medium coupling the first communication port to the second communication port, a method for establishing communication between the computer workstation and the processor comprising:

installing a removable memory medium into the memory drive of the computer workstation;

executing computer readable instructions stored on the removable memory medium for identifying the operating system of the computer workstation as being a particular one of a plurality of predetermined operating systems, the particular operating system having communication software logic for communicating with the second communication port; and executing computer readable instructions stored on the removable memory medium for configuring the communication software logic to communicate with the processor through the digital communication medium according to the network protocol based on the particular operating system.

2. The method of claim 1, the method further including executing computer readable instructions encoded on the removable memory medium to poll the communication software logic to detect a presence or an absence of a network controller associated with the second communication port.

3. The method of claim 1, the method further including executing computer readable instructions encoded on the removable memory medium for:

detecting a presence of the communication software logic encoded on a nonvolatile memory associated with the computer workstation; and displaying a message on a display associated with the computer workstation instructing an installation of the communication software logic on the non-volatile memory.

4. The method of claim 1, the method further including executable computer readable instructions encoded on the removable memory medium for:

transmitting a poll signal from the second communication port to the first communication port according to a network address associated with the first communication port; and upon detection of an acknowledgement signal from the first communication port at the second communication port, transmitting a message to the processor to execute a script according to the network protocol.

5. The method of claim 1, wherein the processor includes a first modem e coupled to the first communication port and the computer workstation is a portable computer including a second modem coupled to the second communication port.

6. The method of claim 5, wherein at least a portion of the digital communication medium includes a public telephone system.

7. A removable memory medium adapted to be received in a memory drive of a computer workstation in a computer network, the computer network including a processor having a first communication port and a configuration for communication through the first communication port according to a network protocol, the computer workstation hosting an operating system and having a second communication port, the removable memory medium having computer readable instructions encoded thereon for:

identifying the operating system of the computer workstation as being a particular one of a plurality of predetermined operating systems, the particular operating system having communication software logic for communicating with the second communication port; and configuring the communication software logic to communicate with the processor through a digital communication medium according to a network protocol based upon the particular operating system.

8. The removable memory medium of claim 7, the removable memory medium further including computer readable instructions encoded thereon for polling the communication software logic to detect a presence or an absence of a network controller associated with the second communication port.

9. The removable memory medium of claim 7, the removable memory medium further including computer readable instructions encoded thereon for:

detecting a presence of the communication software logic encoded on a non-volatile memory associated with the computer workstation; and displaying a message on a display associated with the computer workstation instructing an installation of the communication software logic on the non-volatile memory.

10. The removable memory medium of claim 7, the removable memory medium further including computer readable instructions encoded thereon for:

transmitting a poll signal from the second communication port to the first communication port according to a network address associated with the first communication port; and upon detection of an acknowledgment signal from the first communication port at the second communication port, transmitting a message to the processor to execute a script according to the network protocol.

\* \* \* \* \*